Sept. 1, 1959 G. MELLING, SR 2,901,948
MACHINE TOOL WITH WORK ADVANCING WAYS EXTENDING
PAST PLURAL WORK STATIONS
Filed Nov. 3, 1955 3 Sheets-Sheet 1

INVENTOR.
George Melling, Sr.
BY
Attorney.

INVENTOR.
George Melling, Sr.
BY
Attorney

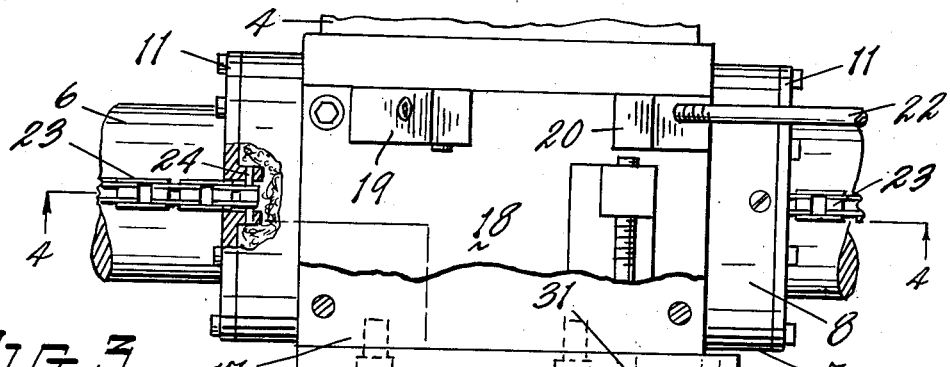
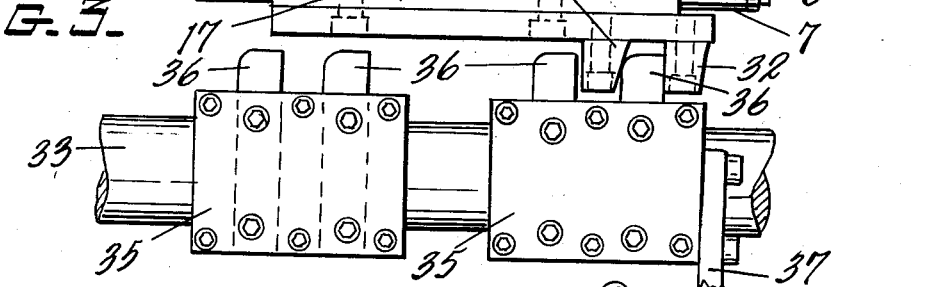
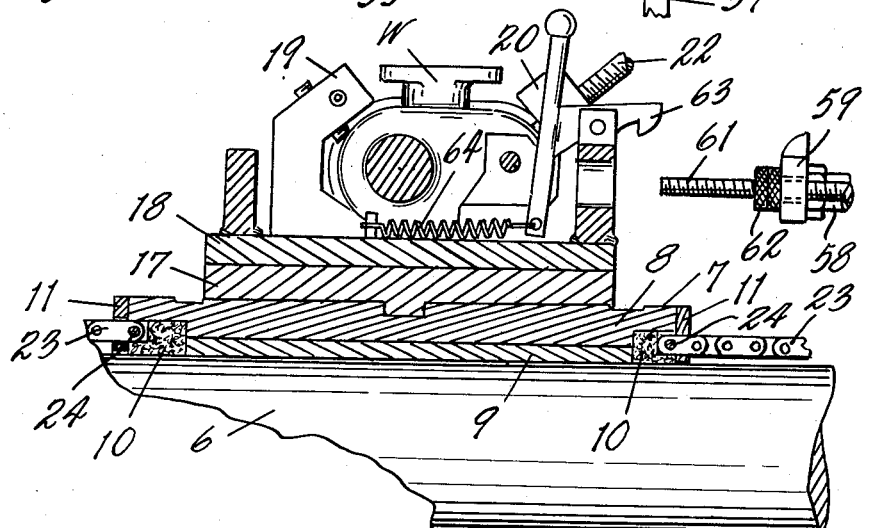
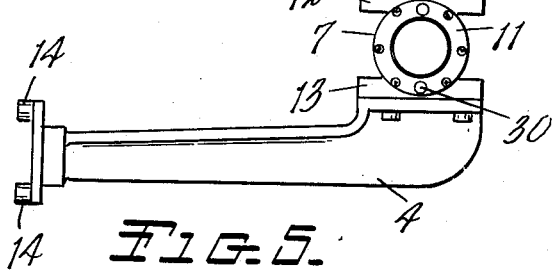

United States Patent Office 2,901,948
Patented Sept. 1, 1959

2,901,948

MACHINE TOOL WITH WORK ADVANCING WAYS EXTENDING PAST PLURAL WORK STATIONS

George Melling, Sr., Jackson, Mich., assignor to Melling Tool Company, Jackson, Mich.

Application November 3, 1955, Serial No. 544,685

2 Claims. (Cl. 90—58)

This invention relates to improvements in machine tools with work advancing ways extending past plural work stations. The principle objects of this invention are:

First, to provide a novel form of carriage supporting ways for a machine tool for advancing a work piece past successive work stations which carriage and ways will securely support the work in alignment with the several work stations.

Second, to provide work advancing ways for a carriage of a plural work station machine tool which provide a tight sliding fit and support for the work carriage to prevent inaccuracies in the positioning of the work and which ways are not subject to wear or damage by dust and chips to destroy the proper alignment of the carriage and the work relative to the work stations.

Third, to provide a machine tool having a work supporting carriage slidably supported with a tight sliding fit on a cylindrical rail and a remote supporting engagement with a second rail to prevent rocking of the carriage on the first rail.

Fourth, to provide means for automatically and manually advancing a work supporting carriage along a cylindrical rail while maintaining the carriage in the same angular relationship to the rail.

Fifth, to provide a machine tool with a longitudinally advanceable work carriage and novel locking means for locking the carriage in selected work stations.

Other objects and advantages of the invention will be apparent from a consideration of the following description and claims.

Fig. 3 is an enlarged fragmentary plan view of the carriage and carriage supporting and locking structure of the machine with portions broken away to illustrate subadjacent parts.

Fig. 4 is a fragmentary transverse cross sectional view taken along the plane of the broken line 4—4 in Figs. 1 and 3.

Fig. 5 is an end elevational view of the carriage bracing arm of the machine.

Figure 1:
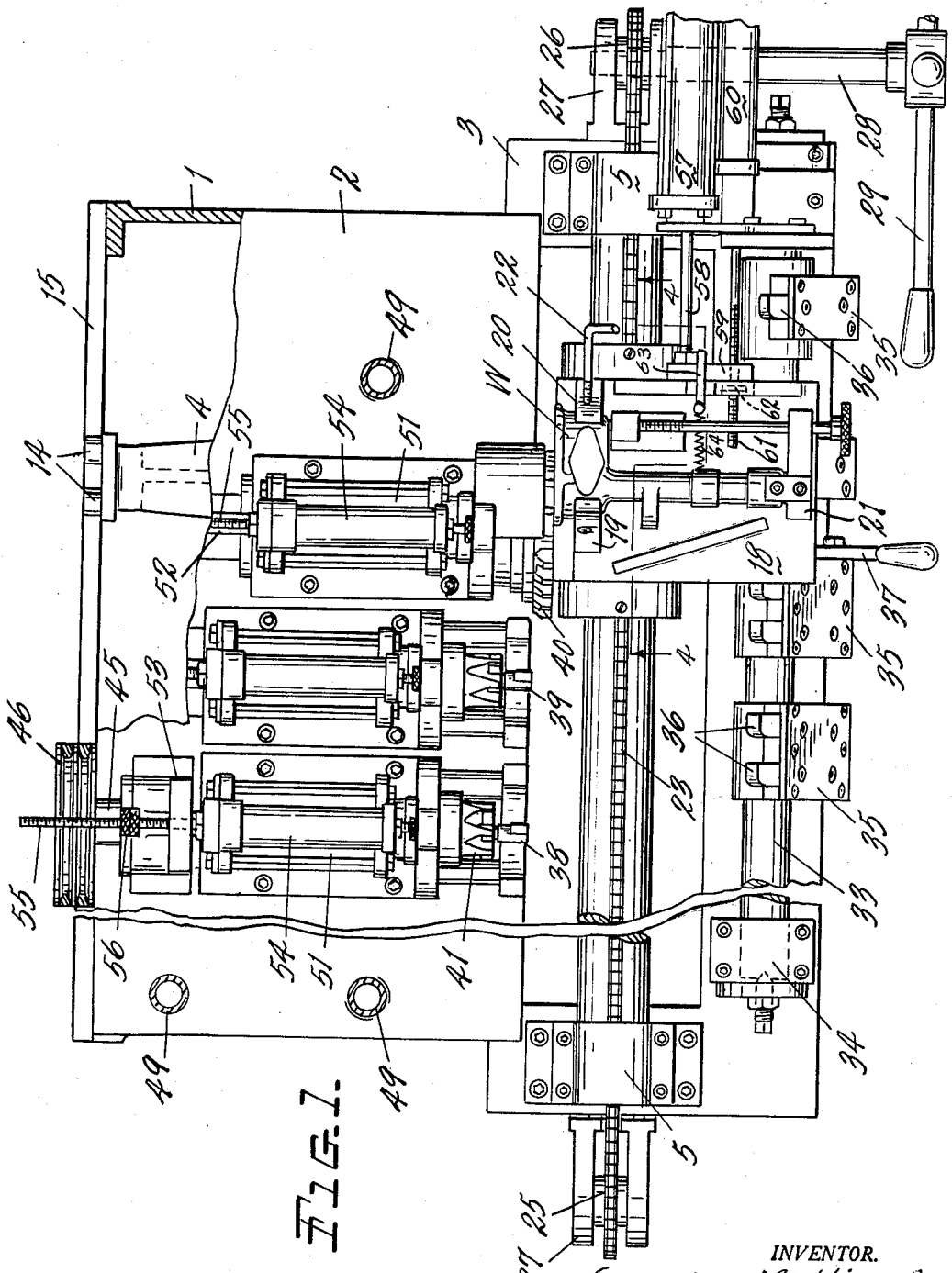
Fig. 1 is a fragmentary plan view of a machine tool embodying the invention with portions of the structure broken away to illustrate internal details.

The machine consists generally of a base 1 having a top platform 2 and a lower platform 3 positioned longitudinally along one side of the top platform. The details of the base 1 are relatively unimportant and so are not illustrated in great detail except to indicate that the underportion of the base is open and unobstructed so as to permit movement through the base of an arm 4 longitudinally along the machine below the level of the platforms 2 and 3.

Figure 2:
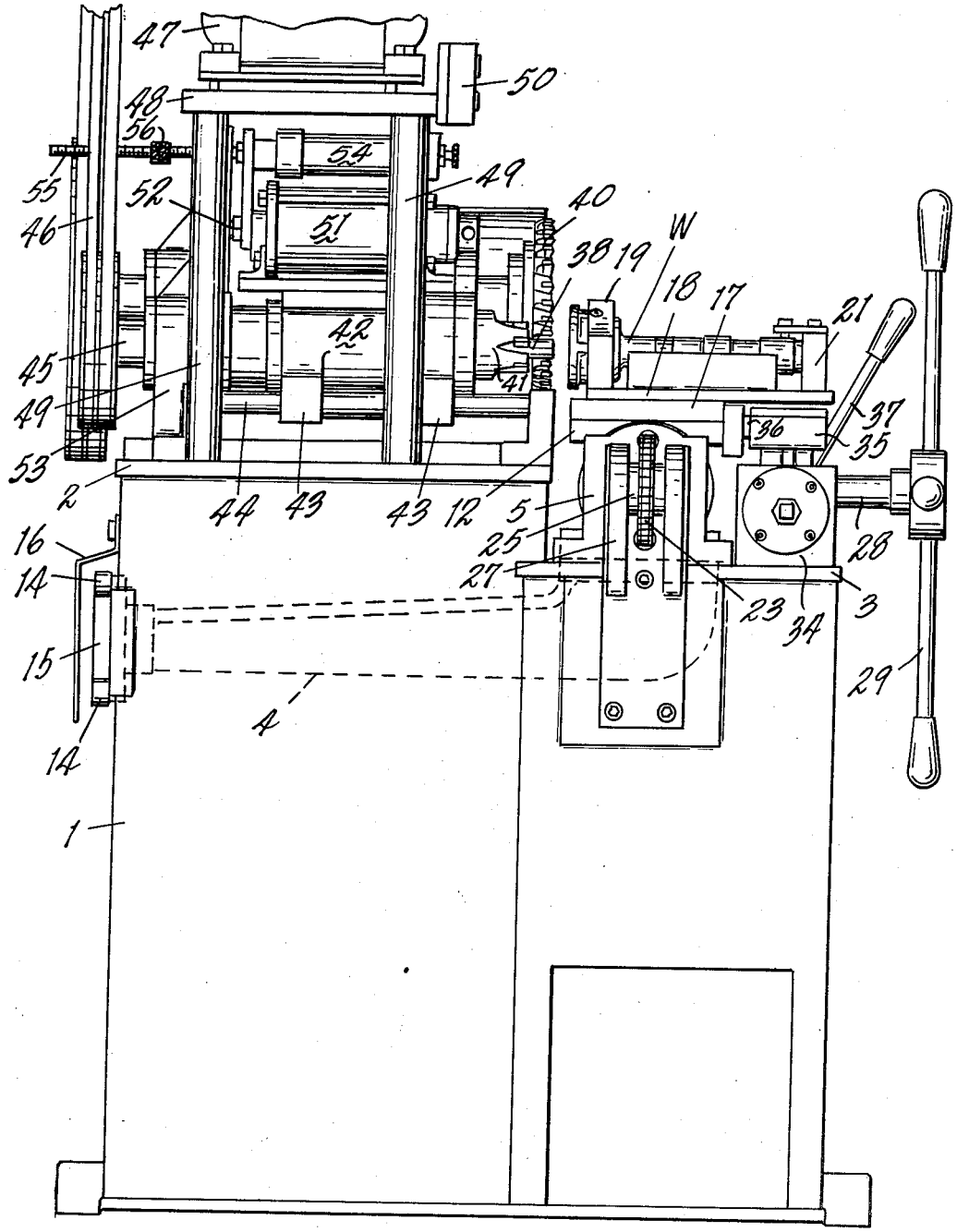
Fig. 2 is a fragmentary end elevational view of the machine shown in Fig. 1.

Mounted in heavy brackets 5 at each end of the lower platform 3 is a relatively large and solid support rail 6 of straight cylindrical shape. The support rail is made strong enough to withstand the working pressures applied to the work without bending or deflecting and is smoothly finished to permit free sliding of a carriage along the rail as will be described. The carriage indicated generally at 7 consists of a generally cylindrical body 8 having a journal bearing 9 therein that tightly and slidably fits the rail 6. The cylindrical shapes of the rail and the bearing 9 permit the parts to be manufactured to close tolerances thus assuring a tight sliding but wear resistance fit between the carriage and the rail 6. The ends of the tubular body 8 are recessed to receive felt or other flexible packing and wiping rings 10 which rings function to prevent any dust or chips from entering between the sliding surfaces of the rail 6 and the bearing 9. Retaining rings 11 secure the packing in the ends of the body. Formed on the upper and lower sides of the body 8 are horizontal flanges 12 and 13. The lower flanges 13 forms a seat and connection for the forward end of the relatively heavy and rigid guide arm 4. The rear end of the guide arm 4 carries vertically spaced follower rollers 14 that are tightly and rollingly engaged with the upper and lower edges of a second rail 15 mounted on the back side of the machine. In order to prevent damage to the tight rolling engagement of the rollers 14 with the rail 15 a shield or hood 16 is positioned over the second rail (see Fig. 2). The foregoing construction provides a very tight sliding support for the carriage 7 that is not subject to wear and deterioration or other damage from dust or chips falling onto the ways. The carriage 7 may thus be moved along the rail 6 with the upper flange 12 always in fixed angular position with respect to the rail. The upper flange 12 has a base plate 17 mounted thereon which plate is fixedly connected to a chuck plate 18. The chuck plate 18 carries work holding jaws or chucks 19 and 20 adapted to rigidly support the desired work piece on the carriage. A thrust block 21 on the forward side of the carriage resists the thrust of the cutting tools on the work as will be pointed out. The chuck jaws 19 and 20 and the thrust plate 21 may be adapted to hold any given work piece and in the example illustrated the work piece consists of a pump body W the face and interior of which it is desired to finish. A screw rod 22 in the chuck jaw 20 releasably clamps the work to the carriage and the other jaw 19.

The carriage 7 and the work mounted thereon is moved longitudinally along the rail 6 by means of a feed chain 23 arranged in a loop and having its ends secured to the opposite ends of the cylindrical body 8 of the carriage by pins 24. The feed chain is looped around sprockets 25 and 26 mounted in brackets 27 at the ends of the lower platform 3. The shaft 28 of the sprocket 26 is extended forwardly and provided with a spoke wheel 29 by means of which the chain loop can be rotated adjusting the position of the carriage. The lower reach of the looped chain 23 passes through a slot provided therefor in the bottom of the cylindrical body 8 as is indicated at 30 in Fig. 4.

In order to fix the longitudinal position of the carriage 7 the forward side of the plate 17 has secured thereto a pair of spaced locking lugs 31 and 32 (see Fig. 3). One side of the lug 32 is perpendicular to the rail 6 while the opposed face of the lug 31 is inclined away from the lug 32 to provide a triangular locking notch. Mounted on the forward side of the platform 3 is a lock shaft 33 rockably supported in bearing brackets 34. The shaft 33 carries a plurality of locking blocks 35 clamped to the lock shaft at adjustable position therealong and each provided with one or more locking lugs 36. The ends of the lugs 36 opposed to the inclined face of the lug 31 are rounded to cammingly engage the lug 31 and place the opposite face of the lug 36 into tight locating engagement with the lug 32 on the carriage. The locking lugs 36 and the rock shaft 33 are rotated forwardly out of engagement with the carriage by means of a handle 37 mounted on the side of one of the lock blocks 35.

The lock blocks 35 are adjusted to engage and lock the carriage and the work piece in preselected longitudinally adjusted positions in the desired registry with any one of a plurality of cutting tools 38, 39 and 40. The cutting tools can be designed to perform any desired machining operation on the work piece and in the example illustrated the cutting tools 38 and 39 include a forward drill and a rearwardly spaced boring tool 41 for the rough and finish cuts of the shaft and gear openings in the oil pump body 4. The cutting tool 40 is an end mill or facing tool for finishing the face of the pump body 4.

The cutters 38 and 40 are connected to shafts mounted within the shaft housings 42. The housings 42 have ears 43 slidably mounted on the transverse support rods 44 so that the cutting tools can be advanced and retracted with respect to the work piece W. The tool shafts have splined driving connections not illustrated with drive shafts 45 projecting from the rear of the machine and connected by suitable belts and pulleys 46 to one or more driving motors 47. The motors 47 are supported on an elevated table 48 with the table in turn being supported on columns 49. The control for the motor is indicated at 50, it being understood that plural controls may be provided when plural motors are used.

The shaft housings 42 and the cutting tools are advanced and retracted by fluid actuated cylinders 51 one of which is mounted on top of each of the drive shaft housings. The cylinders 51 have piston rods 52 projecting to the rear and anchored in an upstanding plate 53 projecting above the platform 2 so that actuation of the cylinders causes reciprocation of the shaft housings. In order to control the speed of advance of the shaft housings and the cutting tools each cylinder 51 has a dash pot 54 mounted on the top thereof and the piston rods 55 of the dash pots project rearwardly through the plate 53 and are provided with stop nuts 56 designed to engage the plate 53 and place a predetermined drag on the advancing motion of the cutting tools as the tools are fed into the work. The facing tool 40 is similarly supported and mounted for reciprocating feeding motion.

Since the facing tool 40 operates by advancing across the face of the pump body W provision is made for automatically feeding the carriage 7 and the pump body longitudinally past the facing tool. For this purpose the right end of the machine as viewed in Fig. 1 is provided with a fluid actuated cylinder 57 secured to the base and having a piston rod 58 projecting longitudinally toward the carriage. A pusher plate 59 on the end of the piston rod is engageable with the side of the carriage to advance the carriage. The speed of advance of the carriage is regulated by a dash pot 60 mounted along side of the cylinder 57 and having a piston rod 61 projecting through the pusher plate 59. Nuts 62 on the dash pot piston rod engage the pusher plate 59 to regulate the speed of advance of the carriage. In order to tie the carriage to the pusher plate 59 and prevent unintentional over feeding of the carriage a latch 63 is pivoted on the carriage to engage the push plate 59. After the operation of the facing tool 40 is complete the operator releases the carriage from the pusher plate 59 by rocking the latch 63 against the tension of the spring 64 and then proceeds to advance the carriage to the next work station by manipulation of the spoke wheel 29 and the handle 37 on the lock shaft.

While the example of the machine has been described as arranged for manual control, it will be appreciated that automatic controls may be provided for successively actuating the several fluid cylinders 51 and 57 and for actuating the rock shaft 37 in the proper timed relation to the fluid cylinders. Various other changes and modifications of the machine may be made without departing from the spirit of the invention. The basic features of the machine are the rigid rail of circular section fitting tightly but slidably within a cylindrical bearing in the carriage and the long arm extending from the carriage to a guide rail with anti-friction bearing means between the arm and the guide rail. The circular rail and bearing not only can be machined to closer more rigid sliding fits than conventional ways but they distribute the bearing load over a greater area and thus reduce unit friction pressure and wear. The remote location of the guide rail at the end of the long arm on the carriage increases the leverage of the guide arm and reduces the pressure on the guide arm bearings so they can be set and kept in tight rigid engagement. The location of the guide bearings remote from the cutting tools protects them from damage by chips.

I have found that with a proper tool support and holder of sufficient rigidity, the work support and carriage described herein will permit the work to be cut in one pass to a degree of accuracy that previously required two cuts or passes.

Having thus described the invention, what is claimed as new and is desired to be secured by Letters Patent is:

1. A support for a movable carriage comprising a cylindrical journal bearing fixedly mounted in said carriage and extending substantially the full length of the carriage along its axis of motion, a solid rail of circular cross section extending through said bearing with a close sliding fit, soft annular packings at each end of said bearing in wiping engagement with said rail, an arm rigidly secured to said carriage on the underside thereof and extending laterally from the rail, a rigid bar supported in spaced parallel relation to said rail, and rollers on said arm engaging opposite sides of said bar and holding the same against rotation about said rail, the distance between said rail and said bar being at least several times the diameter of said rail.

2. A support for a movable carriage comprising a cylindrical journal bearing fixedly mounted in said carriage and extending substantially the full length of the carriage along its axis of motion, a rail of circular cross section extending through said bearing with a close sliding fit, an arm rigidly secured on said carriage and extending laterally from the rail, a rigid bar supported in spaced parallel relation to said rail, and rollers on said arm engaging opposite sides of said bar and holding the same against rotation about said rail, the distance between said rail and said bar being at least several times the diameter of said rail.

References Cited in the file of this patent

UNITED STATES PATENTS

| | | |
|---|---|---|
| 2,126,336 | Mall | Aug. 9, 1938 |
| 2,230,992 | Abbott | Feb. 11, 1941 |
| 2,246,502 | Bramsen | June 21, 1941 |
| 2,481,421 | Hayes | Sept. 6, 1949 |
| 2,745,167 | Cross | May 15, 1956 |
| 2,759,587 | Eckstein | Aug. 21, 1956 |